April 7, 1931. A. JENSEN 1,799,819
APPARATUS FOR REMOVING AND RECOVERING SUBSTANCES
ADHERING TO INTERIOR OF LIQUID CONTAINERS
Filed Nov. 9, 1926 3 Sheets-Sheet 1
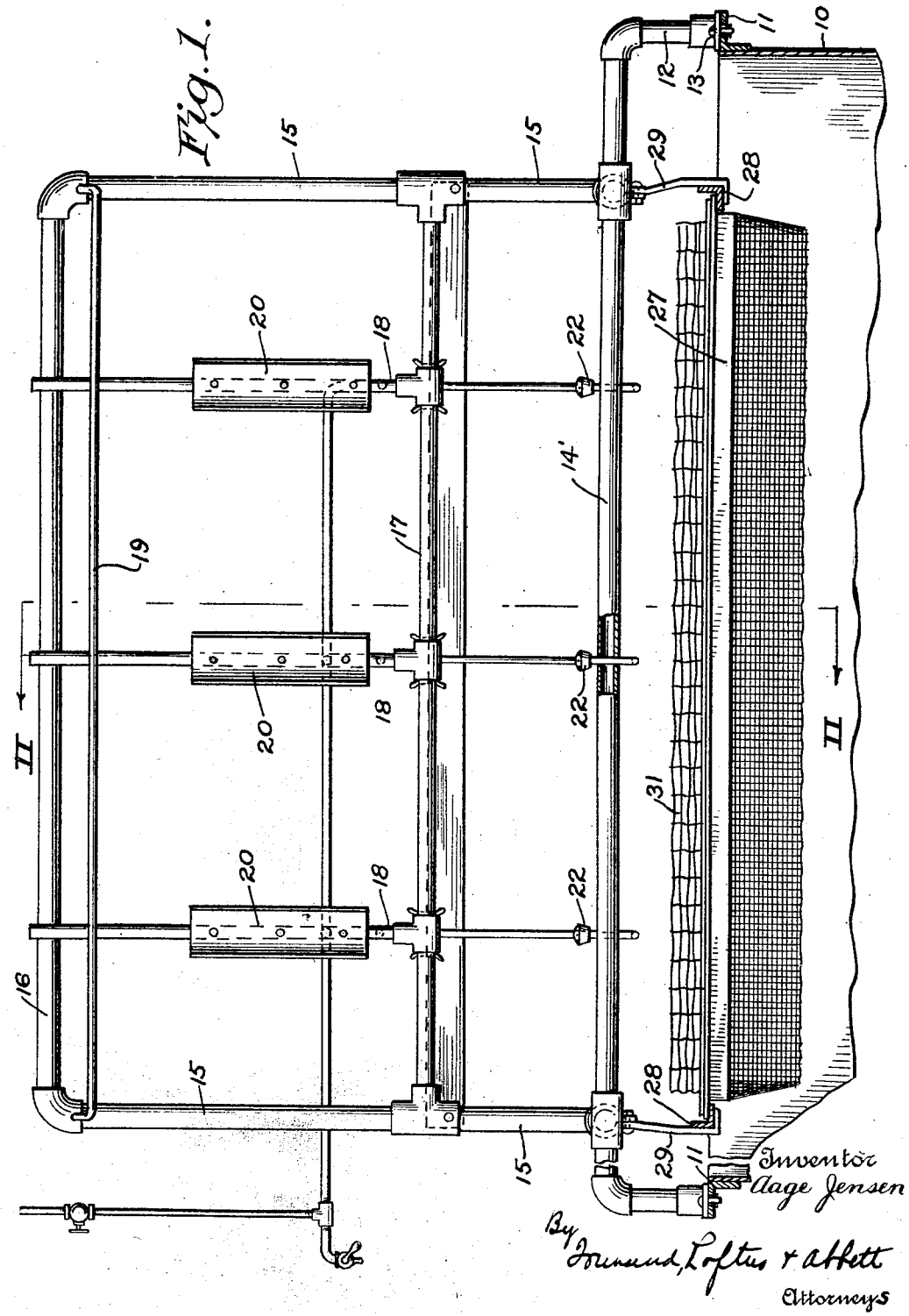
Inventor
Aage Jensen
By Townsend, Loftus & Abbett
Attorneys

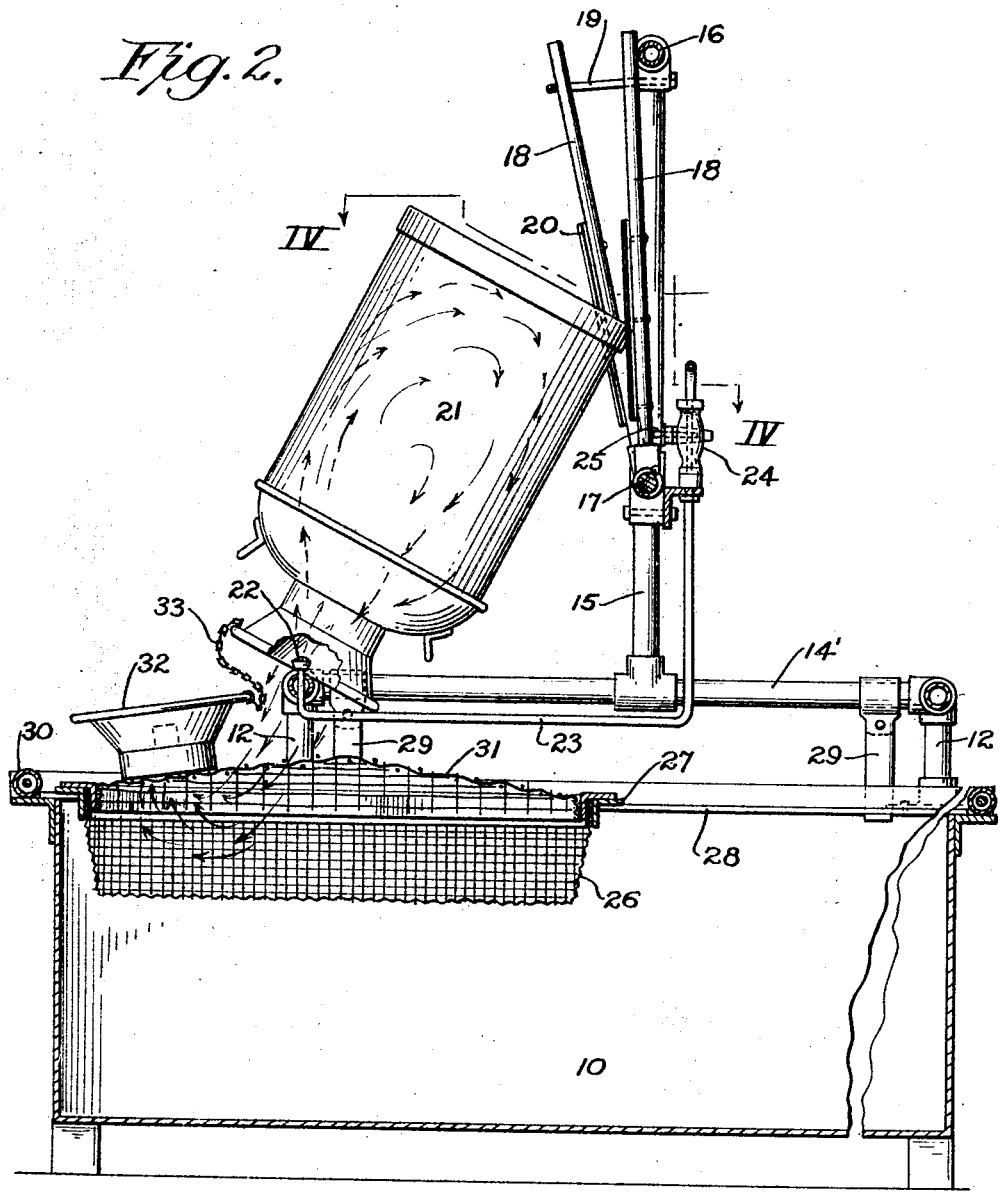

April 7, 1931.  A. JENSEN  1,799,819
APPARATUS FOR REMOVING AND RECOVERING SUBSTANCES
ADHERING TO INTERIOR OF LIQUID CONTAINERS
Filed Nov. 9, 1926  3 Sheets-Sheet 3
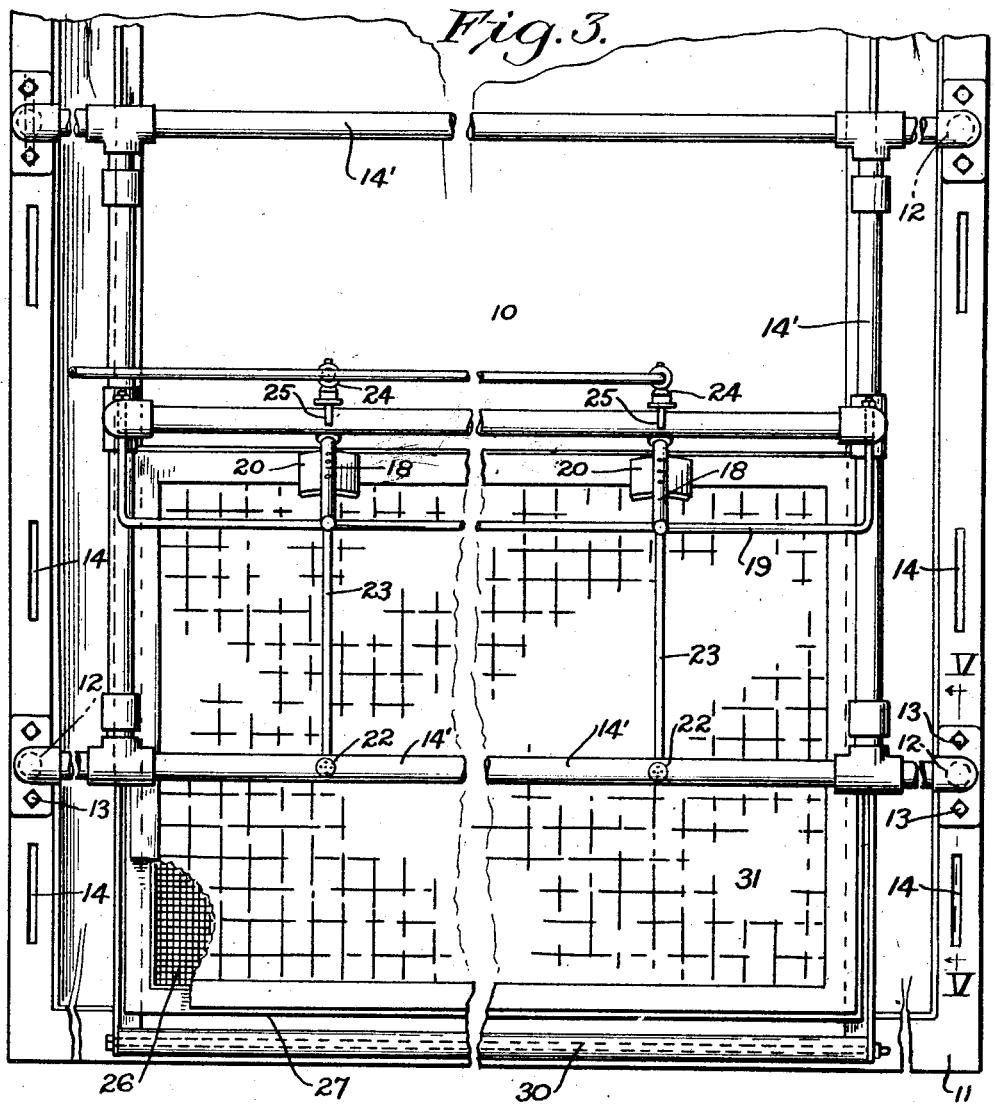
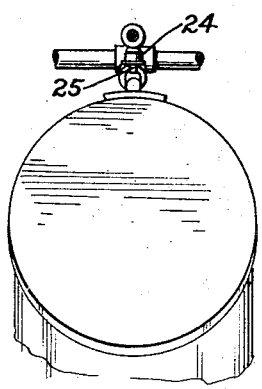
Inventor
Aage Jensen.
By
Townsend, Loftus + Abbett
Attorneys Patented Apr. 7, 1931

1,799,819

UNITED STATES PATENT OFFICE

AAGE JENSEN, OF LOS ANGELES, CALIFORNIA

APPARATUS FOR REMOVING AND RECOVERING SUBSTANCES ADHERING TO INTERIOR OF LIQUID CONTAINERS

Application filed November 9, 1926. Serial No. 147,243.

This invention relates to the operations of emptying or dumping of liquid containers and removing coagulant substances adhering to the interior of the same, and is particularly applicable to cans or containers such as are used in the transporting of milk, cream, and the like.

The object of this invention is to efficiently and quickly remove adhering, viscous, fluid substances from cans or other containers when emptying or transferring, without resorting to the excessive rinsing of the same, thereby causing dilution and often injury to the product. Among products in mind are cream and milk as received by manufacturers of dairy products, including such establishments as creameries, bakeries, hotels, confectioneries, etc.

Millions of cans of cream are being transported and handled yearly between the producer, manufacturer, and user, often necessitating several transfers of the same material; and with each transfer there is attendant more or less mechanical loss of adhering materials.

It is known that a heating medium can be applied to the outside of the container to render the product more fluid; but this is admittedly a slow procedure, especially in modern establishments of large size. Again, the thinning by dilution of the product with heated water or milk can be resorted to; but this is inadvisable, as it immediately changes the composition of the product, even to the point of resulting in adulteration, besides increasing the bulk with a different substance that, as far as water is concerned, is very detrimental to the flavor and keeping quality of cream and milk.

Cream is also liable to become viscous from standing, partly due to chemical action, changes in temperature, or the result of bacterial growth. These changes are liable to proceed to a point where the substance becomes a semi-solid mass that will hold its own weight even after the container is turned upside down.

My device is not only very simple in construction, but also inexpensive to install and operate. As a heating medium I use dry or superheated steam, in order to eliminate moisture as much as possible; or I may resort to some form of neutral gas or heated air. The admission of the heating medium into the container occurs by a slight pressure of the container when placed in an inverted position upon a rack and leaning against an unbalanced vertical lever. This lever automatically presses against the stem of a balanced spring valve. The removal of the container causes the vertical lever to tilt forward, thus releasing the pressure on the valve stem and automatically closing the same.

Provision is also made for mounting a strainer in combination with the rack. This is made to slide on suitable angle supports, in order to permit of cleaning the receiving receptacle. I have also provided a secondary rack made of heavy open-mesh screen of suitable material, the purpose of which is to support the lid of the container, such as the conventional cream can. In general practice, can lids are linked to the top of the can, to prevent misplacement.

The can lid, due to agitation, is always subject to considerable coating on the under surface with cream or other material that also must be saved. By arranging my secondary rack with a slight forward tilt, the lid, when resting on the same, will be subject to the rebound of the heating medium, either steam or gas, as it returns from the container, and thus serves to free the under side of the lid from adhering materials.

One form which my invention may assume is exemplified in the following description and illustrated in the accompanying drawings, in which Fig. 1 shows a front elevation of the rack, with the tank to which the same is applied shown partly in section.

Fig. 2 shows a sectional view taken on the line II—II of Fig. 1.

Fig. 3 shows a plan view of the device.

Fig. 4 shows a view taken on the line IV—IV of Fig. 2.

Fig. 5 shows a detailed sectional view taken on the line V—V of Fig. 3.

The device comprises a tank 10, which may conveniently serve as the receptacle into which the contents of the individual containers are to be dumped. This receptacle has a rim 11 to adjustably receive a steaming-rack. This rack is made up of a tubular frame consisting of corner posts 12 secured to the rim 11 by bolts 13 entering slots 14 in the rim, there being sufficient of these slots to permit desired changes and adjustments in the position of the rack. Horizontal members 14' are secured to each other and to the post 12 to form a rectangular frame. Secured to the side members of the rectangular frame are vertically extending members 15 connected across at their upper ends by a cross-member 16. A second cross-member 17 is arranged between the vertical members 15 intermediate their ends, and on this second cross-member 17 are pivoted a number of rock arms 18, one for each can or container. These rock arms are limited in their movement in one direction by the cross-pipe 16, and in the other direction by a guard 19. Each rock arm has a shield 20 for co-operation with the bottom edge of an inverted container 21.

The front member of the rectangular frame 14' serves as a rest for the open end of the inverted container, and this member carries a suitable number of spray nozzles 22, one for each container. The spray nozzles are supplied with steam, hot air, or other heated gas, through pipes 23, each of which is controlled by a valve 24, one of said valves being located adjacent each of the rock arms. These valves 24 are of the quick-opening type, being held normally closed by a spring, not shown. Each valve has a stem 25 projecting into the path of the adjacent rock arm, so that when the latter is thrust rearwardly by the weight of the tilted container resting thereagainst, the valve is opened, and steam or heated gas is admitted through the spray nozzle 22 to the interior of the can, to render coagulant substances fluid. As soon as the can is removed from the rack, the rock arm falls forwardly by gravity and allows the valve to close.

A basket 26, of fine-mesh screen, is suitably supported in the tank 10, beneath the spray nozzles, and serves as a strainer when dumping the contents of the cans into the vat. This basket has an angle iron frame 27 slidably supported upon rails 28, the rails being suspended from the rectangular frame 14 by straps 29. There is a heavy tubular member 30 connected across the frame ends of the rails 28, to serve as a bumper and protector when dumping the containers.

Over the top of the basket 26 is a tray 31 of coarse-mesh screen, to provide a support for the lid 32 of the container. This lid is placed on the tray 31 right side up, and steam or gas escaping from the container and striking the basket will, by virtue of the film or layer of cream or semi-solid particles therein, be deflected as shown by arrows, so as to come in contact with the bottom of the lid and dislodge adhering substances.

The lid is usually attached to the can by a chain 33; and it is important in arranging the lid on the tray to have it right side up, so that the top of the same, which may contain contaminating substances, shall not be exposed to the action of the steam with the consequent liability of washing foreign matter into the tank or basket.

While it is preferable to combine the steaming rack with a tank into which the contents of the containers is first dumped, it is obvious that said rack may be otherwise employed. Various other changes in the construction and arrangement of the several parts herein shown and described may be employed without departing from the spirit of my invention, as disclosed in the appended claims.

Having thus described my invention, what I claim as new and desire to secure by Letters Patent is:

1. In an apparatus of the character mentioned, a spray nozzle, means for supplying a dry, hot gas to the nozzle, means to support a container in inverted and inclined position over said nozzle, and controlling means actuated by the weight of the container in inclined position to control the supply of gas to the nozzle, said controlling means comprising a normally closed valve connected to a pivoted arm against which the bottom of the container is adapted to rest, said pivoted arm being movable under pressure of the container to open the valve.

2. In an apparatus of the character mentioned, a receptacle, a nozzle above the receptacle, means for supplying a dry, hot gas to the nozzle, means to support a container in inclined inverted position over said nozzle, means adjacent the nozzle, to support the lid of the container in right side up position, and means effective during the operation to direct the gas escaping from the container so as to cause it to swirl against the underneath surfaces of the lid, for the purposes mentioned.

3. In an apparatus of the character mentioned, a receptacle, a nozzle above the receptacle, means for supplying a dry, hot gas to the nozzle, means to support a container in inverted position over the nozzle, a strainer in the form of a basket movably supported on the receptacle adjacent the nozzle, and a coarse screen overlying the strainer and adapted to support the lid of the container right side up.

4. In an apparatus of the character mentioned, a vat, a can-rack arranged over the vat and comprising a horizontal member upon which the mouths of a plurality of containers are adapted to rest, pivotally mounted vertical members against which the bottoms of the cans in inverted and inclined position are adapted to rest, a plurality of nozzles, one for each container, arranged upon said horizontal member, means for supplying a dry, hot gas to each of said nozzles, a valve controlling the supply of gas to each nozzle, and means actuated by the pivotally mounted members for controlling said valves, whereby when the containers are in inverted and inclined position the hot gas will be sprayed into the interior thereof, and when the containers are removed the valves will automatically close, to shut off the supply of gas.

5. In an apparatus of the character mentioned, a receptacle, a nozzle above the receptacle, means for supplying a dry hot gas to the nozzle, means to support a container in inclined, inverted position over said nozzle, means adjacent the nozzle to support the lid of the container in right side up inclined position, and means to cause the material drained from said container to gather to form a deflecting surface to direct the gas escaping from said container to swirl against the lower surfaces of said lid.

AAGE JENSEN.